(12) United States Patent
Takei et al.

(10) Patent No.: US 10,161,740 B1
(45) Date of Patent: Dec. 25, 2018

(54) CONFOCAL DISPLACEMENT SENSOR

(71) Applicant: Keyence Corporation, Osaka (JP)

(72) Inventors: Hideto Takei, Osaka (JP); Tomikazu Sakaguchi, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 15/981,924

(22) Filed: May 17, 2018

(30) Foreign Application Priority Data

Jun. 13, 2017 (JP) .................................. 2017-115555

(51) Int. Cl.
*G01B 11/02* (2006.01)
*G01J 3/02* (2006.01)

(52) U.S. Cl.
CPC .......... *G01B 11/026* (2013.01); *G01J 3/0208* (2013.01); *G01J 3/0218* (2013.01); *G01J 3/0291* (2013.01)

(58) Field of Classification Search
CPC ...... G01B 11/026; G01J 3/0208; G01J 3/0218
USPC ......................................................... 356/614
See application file for complete search history.

(56) References Cited

U.S. PATENT DOCUMENTS

| | | | | |
|---|---|---|---|---|
| 5,737,084 A * | 4/1998 | Ishihara | ............... | G01B 11/026 356/609 |
| 5,785,651 A * | 7/1998 | Kuhn | .................... | G01B 11/026 250/339.06 |
| 8,427,644 B2 * | 4/2013 | Miki | .................... | G01B 11/026 356/364 |
| 8,773,757 B2 * | 7/2014 | Chen | .................. | G02B 21/0032 359/368 |
| 9,541,376 B2 * | 1/2017 | Kubo | ................. | G02B 21/0064 |
| 2006/0109483 A1 * | 5/2006 | Marx | ................. | G01B 11/0608 356/609 |
| 2010/0208486 A1 * | 8/2010 | Gladnick | ............. | G01B 11/026 362/551 |
| 2011/0013186 A1 * | 1/2011 | Miki | .................... | G01B 11/026 356/364 |
| 2012/0019821 A1 * | 1/2012 | Chen | .................. | G02B 21/0032 356/303 |
| 2014/0236022 A1 * | 8/2014 | Zeng | .................. | A61B 1/00172 600/476 |

(Continued)

OTHER PUBLICATIONS

U.S. Appl. No. 15/981,925, filed May 17, 2018 (84 pages).

(Continued)

*Primary Examiner* — Roy M Punnoose
(74) *Attorney, Agent, or Firm* — Kilyk & Bowersox, P.L.L.C.

(57) ABSTRACT

The confocal displacement sensor includes a first optical fiber, to a first incident end of which light for light projection is input, the first optical fiber outputting the light from a first emission end, a second optical fiber, a second incident end of which is disposed to be opposed to the first emission end, the second optical fiber emitting light input via the second incident end from a second emission end, an optical member configured to cause an axial chromatic aberration on detection light emitted via the second emission end and converge the detection light toward the measurement object, a fiber connecting section configured to detachably connect the second incident end to the first emission end, and a refractive index matching material disposed between the first emission end and the second incident end.

15 Claims, 12 Drawing Sheets

(56) References Cited

U.S. PATENT DOCUMENTS

2015/0185454 A1* 7/2015 Kalkbrenner ...... G02B 21/0032
250/550
2016/0249812 A1* 9/2016 Wang .................. A61B 5/0059
600/407

OTHER PUBLICATIONS

U.S. Appl. No. 15/981,927, filed May 17, 2018 (51 pages).
U.S. Appl. No. 15/989,215, filed May 25, 2018 (162 pages).
U.S. Appl. No. 15/989,216, filed May 25, 2018 (147 pages).

* cited by examiner

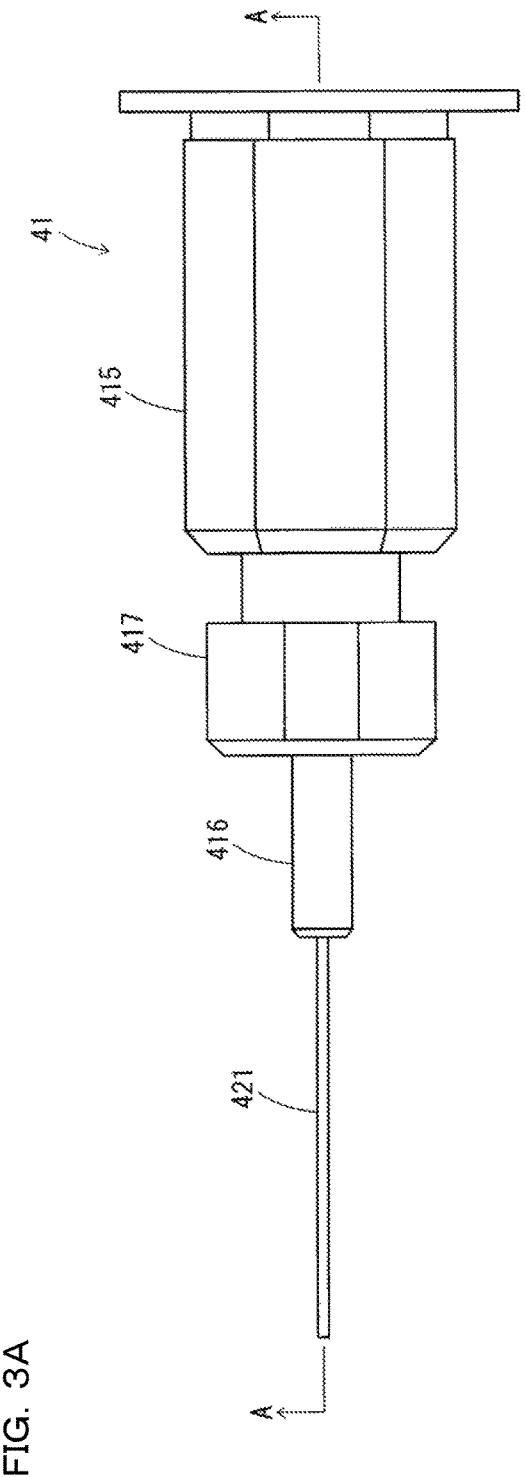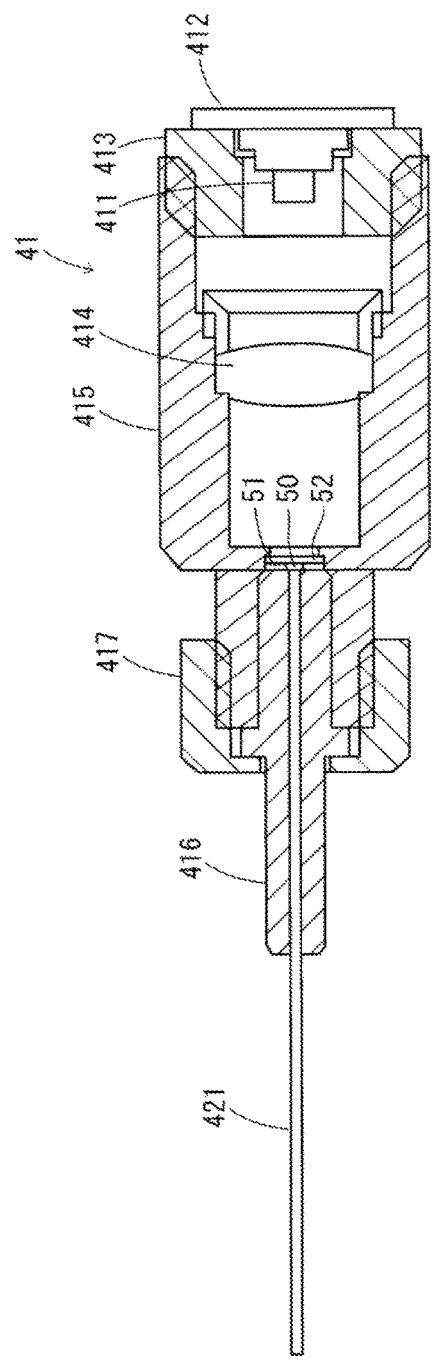
FIG. 3A
FIG. 3B

SPECTROSCOPE 44

WHEN END FACE IS PERPENDICULAR TO CENTER AXIS

LIGHT

WHEN END FACE IS INCLINED

φ

CONFOCAL DISPLACEMENT SENSOR

CROSS-REFERENCE TO RELATED APPLICATIONS

The present application claims foreign priority based on Japanese Patent Application No. 2017-115555, filed Jun. 13, 2017, the contents of which is incorporated herein by reference.

BACKGROUND OF THE INVENTION

1. Field of the Invention

The present invention relates to a confocal displacement sensor and, more particularly, to improvement of a confocal displacement sensor that measures displacement of a measurement object using a confocal optical system.

2. Description of Related Art

A confocal displacement sensor is an optical measurement device that measures displacement of a measurement object making use of a confocal principle of stopping down received light into reflected light from an image forming surface on which an image of a light source is formed and a phenomenon of an axial chromatic aberration in which a color drift in an optical axis direction occurs in the image of the light source.

The confocal displacement sensor is configured by a pinhole that emits, as a point light source, light emitted from a light source for light projection, an optical member that causes an axial chromatic aberration in detection light emitted via the pinhole and converges the detection light toward the measurement object, and a spectroscope that spectrally disperses reflected light from the measurement object and generates a light reception signal. As the detection light, light having a plurality of wavelengths, for example, white light is used. The pinhole allows, in the detection light irradiated on the measurement object via the optical member, detection light having a wavelength reflected while focusing on the measurement object to pass.

The position of the image forming surface is different for each wavelength according to the axial chromatic aberration. Therefore, displacement of the measurement object is calculated by specifying a wavelength of the detection light passed through the pinhole. The displacement is the distance in the optical axis direction from a predetermined reference position to the measurement object. The depth or the height of unevenness on a surface, the thickness of a transparent body, and the like can be measured by calculating the displacement.

In some confocal displacement sensor, a head unit including a confocal optical system and a control unit including a light source for light projection and a spectroscope are configured from separate housings. Light of the light source for light projection is transmitted to the head unit via an optical fiber. In the displacement gauge of this type, a fiber connecting section, to and from which the optical fiber extending from the head unit is attached and detached, is often provided in the control unit.

In the confocal displacement sensor in the past explained above, when light reflected on an end face of the optical fiber in the head unit or the fiber connecting section is received as return light, a background component with respect to a signal component increases. Therefore, measurement accuracy is deteriorated. In particular, when a light amount of the light source for light projection is increased in order to measure a measurement object having a low surface reflectance, the background component due to the return light also increases. When an exposure time and a gain in acquiring a light reception signal are increased, a light reception amount is saturated. Therefore, it is difficult to appropriately remove the background component.

SUMMARY OF THE INVENTION

The present invention has been devised in view of the circumstances, and an object of the present invention is to provide a confocal displacement sensor that can improve measurement accuracy. In particular, an object of the present invention is to provide a confocal displacement sensor that can improve measurement accuracy for a measurement object having a low reflectance.

A confocal displacement sensor according to a first aspect of the present invention is a confocal displacement sensor that measures displacement of a measurement object using a confocal optical system. The confocal displacement sensor includes: a light source for light projection configured to generate light having a plurality of wavelengths; a first optical fiber, to a first incident end of which light emitted from the light source for light projection is input, the first optical fiber outputting the light from a first emission end; a second optical fiber, a second incident end of which is disposed to be opposed to the first emission end, the second optical fiber emitting light input via the second incident end from a second emission end; an optical member configured to cause an axial chromatic aberration on detection light emitted via an end face of the second emission end and converge the detection light toward the measurement object; a spectroscope configured to spectrally disperse, in the detection light irradiated on the measurement object via the optical member, detection light passed through the end face of the second emission end by being reflected while focusing on the measurement object and generate a light reception signal representing light reception intensity for each wavelength; a measurement control section configured to calculate displacement of the measurement object on the basis of the light reception signal; a fiber connecting section configured to detachably connect the second incident end to the first emission end; and a refractive index matching material disposed between the first emission end and the second incident end in contact with both end faces of the first emission end and the second incident end and configured to reduce a change in a refractive index between the first optical fiber and the second optical fiber. The second emission end has the end face inclined at a first inclination angle with respect to a plane perpendicular to a center axis of the second optical fiber. The second incident end and the first emission end respectively have the end faces inclined at a second inclination angle smaller than the first inclination angle.

In the confocal displacement sensor, all of the first emission end of the first optical fiber and the second incident end and the second emission end of the second optical fiber have the inclined end faces. Transmission of light reflected on the end faces is prevented. Therefore, it is possible to reduce a background component corresponding to the reflected light by the end faces. In particular, since the inclination angle of the second incident end and the first emission end is smaller than the inclination angle of the second emission end, it is possible to prevent a center axis from deviating between the first optical fiber and the second optical fiber because of a slip while reducing the background component. Since the refractive index matching material is disposed between the first emission end and the second incident end and a change in the refractive index is reduced, it is possible to prevent reflection by the end faces of the first emission end and the second incident end.

In a second aspect of the present invention, in addition to the configuration explained above, the confocal displacement sensor may include: a head housing configured to house the optical member and the second emission end on an inside; and a control housing configured to house the light source for light projection, the first optical fiber, the spectroscope, and the measurement control section on an inside and disposed to expose the fiber connecting section from a front surface. The refractive index matching material may be sheet-like and stuck to a joining surface of the fiber connecting section.

With such a configuration, since the refractive index matching material is disposed on the control housing side, it is possible to replace the head housing and the second optical fiber without replacing the refractive index matching material. Since the refractive index matching material is sheet-like, it is easy to handle the refractive index matching material.

In a third aspect of the present invention, in addition to the configuration explained above, in the confocal displacement sensor, the refractive index matching material may be configured to be a solid or gelatinous. With such a configuration, it is easy to handle the refractive index matching material.

In a fourth aspect of the present invention, in addition to the configuration explained above, in the confocal displacement sensor, a protection shutter may be provided in an insertion port of the fiber connecting section into which the second incident end is inserted. With such a configuration, it is possible to protect the end face of the first emission end in the fiber connecting section from scratches and adhesion of stains or prevent light for light projection from leaking from the insertion port.

In a fifth aspect of the present invention, in addition to the configuration explained above, in the confocal displacement sensor, the first inclination angle may be 13° or more and the second inclination angle may be 5° or more and 15° or less. With such a configuration, it is possible to appropriately reduce the influence of the reflected light by the end faces.

In a sixth aspect of the present invention, in addition to the configuration explained above, in the confocal displacement sensor, the refractive index matching material may be fixed to a joining surface on the control housing side using an adhesive. With such a configuration, it is possible to prevent foreign matters such as dust from adhering to a surface of the refractive index matching material.

According to the present invention, the background component corresponding to light reflected on an end face of an optical fiber decreases. Therefore, it is possible to improve measurement accuracy for a measurement object having a low refractive index.

BRIEF DESCRIPTION OF THE DRAWINGS

FIGS. 3A and 3B are diagrams showing a configuration example of a light source for light projection shown in FIG. 1.

DESCRIPTION OF EMBODIMENTS

An embodiment of the present invention is explained below with reference to the drawings. In this specification, for convenience, a direction of an optical axis of a head unit is explained as an up-down direction. However, a posture and a direction during use of the head unit are not limited.

Confocal Displacement Sensor 1

Figure 1:
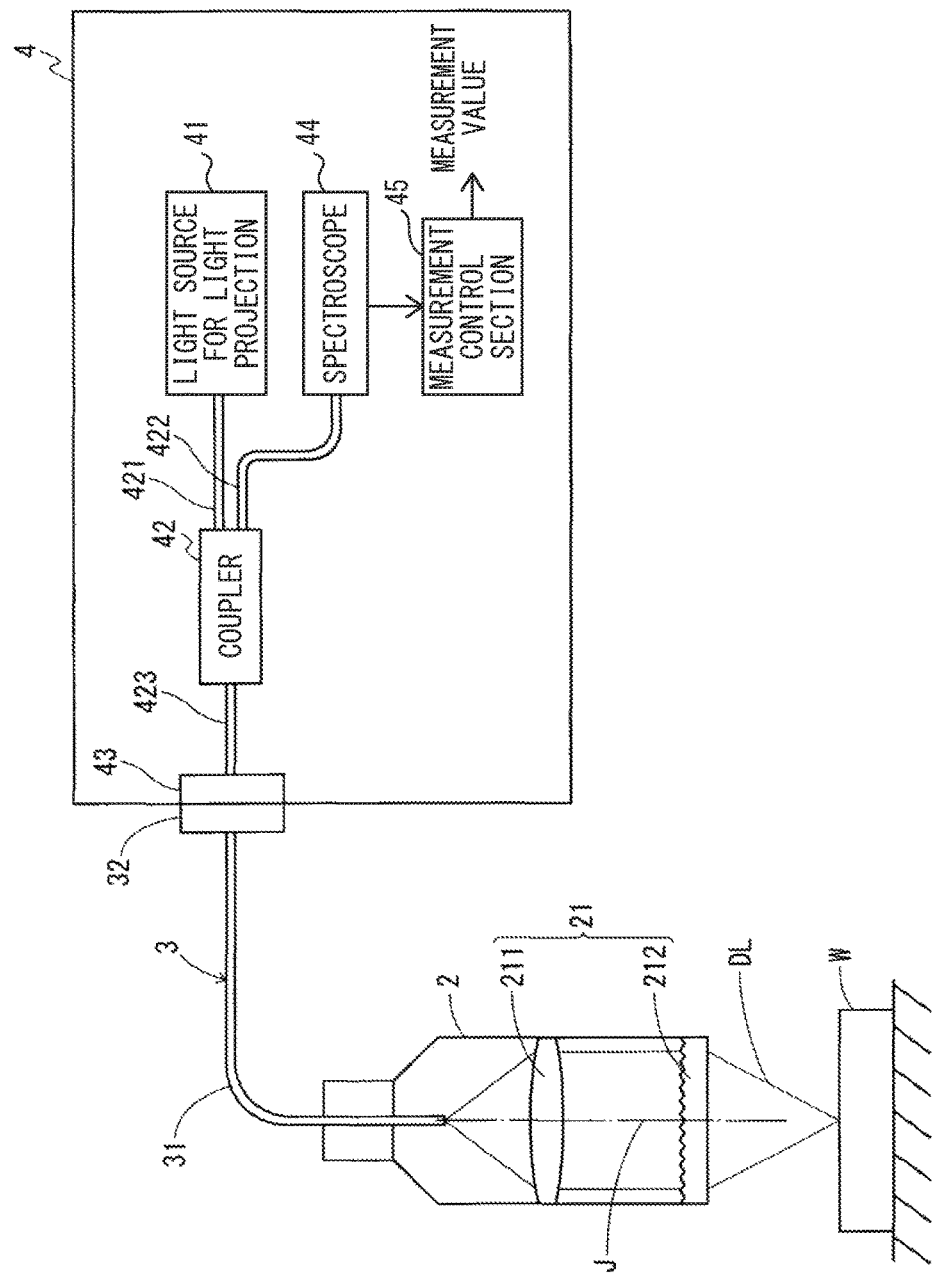
FIG. 1 is a system diagram showing a configuration example of a confocal displacement sensor according to an embodiment of the present invention.

FIG. 1 is a system diagram showing a configuration example of a confocal displacement sensor 1 according to the embodiment of the present invention. The confocal displacement sensor 1 is an optical measurement device configured by a head unit 2, a fiber cable 3, and a control unit 4. The optical measurement device receives reflected light from a measurement object W when detection light DL is emitted from the head unit 2 and measures displacement of the measurement object W.

The head unit 2 and the control unit 4 are connected to each other via the fiber cable 3. The fiber cable 3 includes an optical fiber 31 that transmits light for light projection. A fiber connecting section 32 is provided at one end of the fiber cable 3. The fiber connecting section 32 is detachably connected to a fiber connecting section 43 of the control unit 4.

The head unit 2 is an optical unit that emits the detection light DL toward the measurement object W. Reflected light from the measurement object W is made incident on the optical unit. The head unit 2 includes an optical member 21 including a refraction lens 211 and a diffraction lens 212. The optical member 21 causes an axial chromatic aberration in the detection light DL emitted via an emission end face of the optical fiber 31 and converges the detection light DL toward the measurement object W. The axial chromatic aberration is a color drift of an image in an optical axis direction due to dispersion.

In the confocal displacement sensor 1, the light for light projection is transmitted to the head unit 2 via the optical fiber 31. An irradiation spot is formed on the measurement object W by the detection light DL emitted from the head unit 2. The emission end face of the optical fiber 31 functions as a pinhole that allows light emitted from a light source for light projection 41 to pass to be a point light source that emits the detection light DL. The emission end face of the optical fiber 31 also functions as a pinhole that allows detection light having a wavelength reflected while focusing on the measurement object W in the detection light DL irradiated on the measurement object W via the optical member 21.

The control unit 4 is a processing device that controls projected and received lights and calculates displacement of the measurement object W on the basis of reflected light corresponding to the irradiation spot. The control unit 4 is configured by the light source for light projection 41, a coupler 42, the fiber connecting section 43, a spectroscope 44, and a measurement control section 45. The light source for light projection 41 is a light source device that generates light having a plurality of wavelengths, for example, white light as the detection light DL.

The coupler 42 is a directive coupler that outputs light input from the light source for light projection 41 toward the head unit 2 and, on the other hand, outputs the detection light DL input from the head unit 2 toward the spectroscope 44. The coupler 42 is a Y coupler, from one end of which two optical fibers 421 and 422 extend and from the other end of which one optical fiber 423 extends.

Light emitted from the light source for light projection 41 is input to an incident end of the optical fiber 421 and output to the optical fiber 31 from an emission end of the optical fiber 423. The incident end of the optical fiber 31 is disposed to be opposed to the emission end of the optical fiber 423. The optical fiber 31 emits light input via the incident end from the emission end. The fiber connecting section 43 detachably connects an incident end of the optical fiber 31 to the emission end of the optical fiber 423.

On the other hand, the detection light DL reflected by the measurement object W and transmitted through the head unit 2 and the optical fiber 31 is input to the emission end of the optical fiber 423 via the fiber connecting sections 32 and 43 and emitted toward the spectroscope 44 from an emission end of the optical fiber 422.

The spectroscope 44 spectrally disperses the detection light DL passed through the emission end face of the optical fiber 31 and generates a light reception signal representing light reception intensity for each wavelength. The measurement control section 45 controls the light source for light projection 41 on the basis of the light reception signal of the spectroscope 44 and adjusts the intensity of light for light projection, an exposure time in receiving reflected light, and a gain in amplifying a light reception signal.

The measurement control section 45 calculates displacement of the measurement object W on the basis of the light reception signal generated by the spectroscope 44 and outputs the displacement of the measurement object W to a not-shown display device and a not-shown external device as a measurement value. Specifically, the measurement control section 45 acquires a light reception waveform formed by light reception intensity for each wavelength from the spectroscope 44 and specifies a peak position of the light reception waveform to thereby calculate displacement of the measurement object W. The peak position is a pixel position where the light reception intensity is the largest. The peak position corresponds to a specific wavelength.

Note that an X coupler may be used as the coupler 42. In the X coupler, reflection by an end face is easily prevented compared with the Y coupler. Such an optical fiber coupler is a fusion-type coupler to which a plurality of optical fibers are fused. However, the optical fiber coupler may be a coupler of a type that divides light using a beam splitter.

The fiber connecting sections 32 and 43 are connectors that detachably connect optical fibers. The fiber connecting section 32 is provided at one end of the fiber cable 3. The incident end of the optical fiber 31 is disposed in the fiber connecting section 32.

On the other hand, the emission end of the optical fiber 423 is disposed in the fiber connecting section 43. The fiber connecting section 43 attaches and detaches the incident end of the optical fiber 31 to and from the emission end of the optical fiber 423. The incident end of the optical fiber 31 is disposed to be opposed to the emission end of the optical fiber 423. The optical fiber 31 emits light input via the incident end from the emission end.

Head Unit 2

Figure 2:
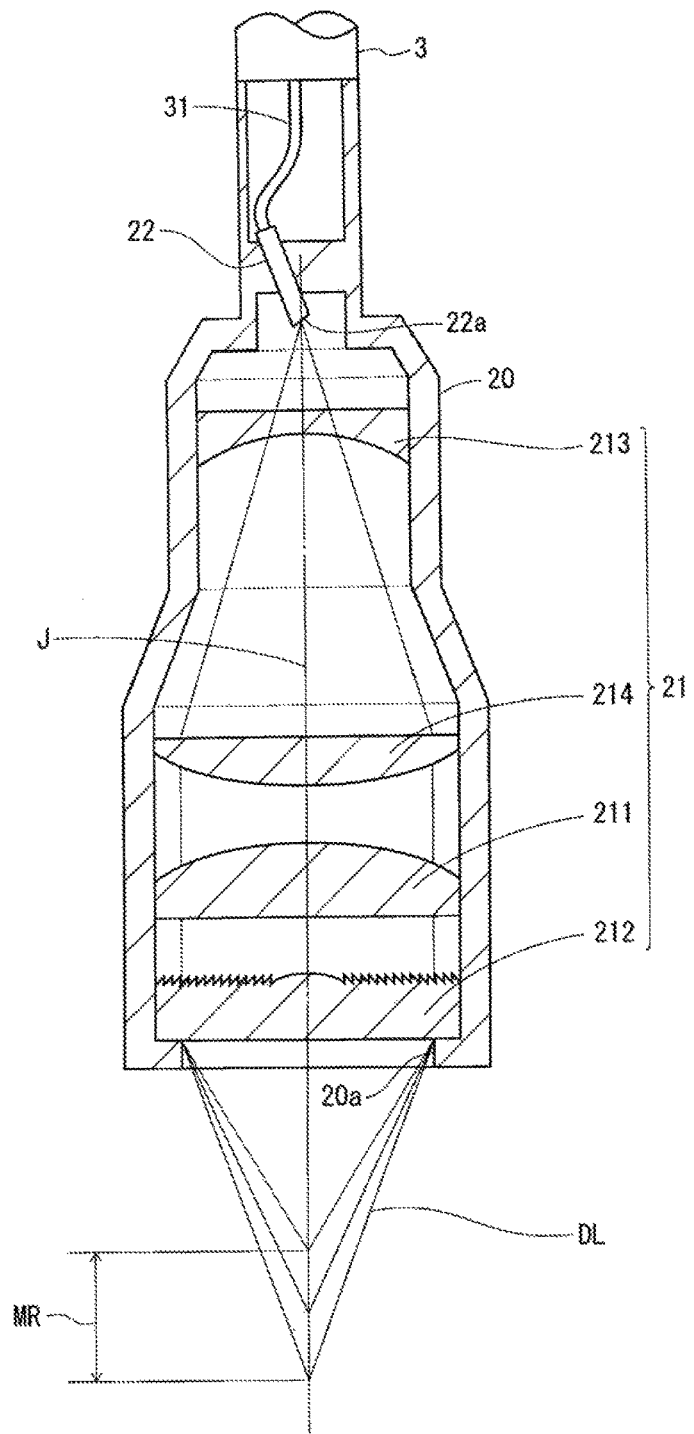
FIG. 2 is a sectional view schematically showing a configuration example of a head unit shown in FIG. 1.

FIG. 2 is a sectional view schematically showing a configuration example of the head unit 2 shown in FIG. 1. A cut surface of the head unit 2 cut along a plane including an optical axis J is shown. The head unit 2 is configured by a head housing 20, the optical member 21, and an optical fiber ferrule 22.

The head housing 20 is a lens barrel member that houses, on the inside, the optical member 21 and the optical fiber ferrule 22 including the emission end of the optical fiber 31. The head housing 20 is formed in, for example, a covered cylindrical shape having the optical axis J as a center axis. The optical member 21 is configured by refraction lenses 211, 213, and 214 and the diffraction lens 212. The refraction lenses 213, 214, and 211 and the diffraction lens 212 are arrayed in this order.

The refraction lenses 211, 213, and 214 are optical lenses that condense or diffuse incident light making use of a light refraction phenomenon. The refraction lenses 211, 213, and 214 refract the detection light DL emitted via the emission end face of the optical fiber 31.

The diffraction lens 212 is an optical lens that condenses or diffuses incident light making use of a light diffraction phenomenon. The diffraction lens 212 diffracts the detection light DL emitted via the emission end face of the optical fiber 31. The diffraction lens 212 is a relief-type diffraction lens. A lens surface on the upper side of the diffraction lens 212 is a diffraction surface. A fine relief (undulation) is formed on the diffraction lens 212. The depth in the optical axis direction of the relief is approximately a wavelength of light. A plurality of annular patterns centering on the optical axis J are disposed in the relief. A lens surface on the lower side of the diffraction lens 212 is a flat non-diffraction surface.

The diffraction lens 212 is disposed substantially coaxially with the refraction lenses 211, 213, and 214 and disposed in a position most distant from the emission end of the optical fiber 31 in the optical member 21. The diffraction lens 212 is disposed such that the non-diffraction surface is exposed via an opening for light projection 20a of the head housing 20. Note that all of the refraction lenses 211, 213, and 214 and the diffraction lens 212 are single lenses. However, the refraction lenses 211, 213, and 214 and the diffraction lens 212 may be doublet lenses each obtained by combining a plurality of optical lenses.

The optical fiber ferrule 22 is a holding member that holds the optical fiber 31 configuring the fiber cable 3. The emission end of the optical fiber 31 is held by a resin member. The optical fiber ferrule 22 is disposed to be projected to the lower side from a top lid section of the head housing 20.

The optical fiber 31 is configured by a core and a clad. An end face of the core functions as a pinhole. That is, the end face of the core of the optical fiber 31 has a sufficiently small diameter compared with a space in which the emission end of the optical fiber 31 is disposed. The end face of the core of the optical fiber 31 can selectively allow light made incident via the optical member 21 to pass. The refraction lenses 211, 213, and 214 are disposed between the optical fiber ferrule 22 and the diffraction lens 212. The emission end face of the optical fiber 31 and the optical member 21 configure a confocal optical system.

The confocal optical system stops down received light making use of a confocal principle and causes an axial chromatic aberration in the detection light DL. Therefore, the detection light DL emitted via the emission end face of the optical fiber 31 and transmitted through the optical member 21 focuses on a different position in the up-down direction according to a wavelength. Among wavelength components included in the detection light DL, a specific wavelength component focusing on the measurement object W is reflected by the measurement object W. Reflected light of the specific wavelength component is transmitted through the optical member 21 and focuses on the emission end face of the optical fiber 31. On the other hand, reflected light corresponding to wavelength components other than the specific wavelength component is blocked without focusing on the emission end face of the optical fiber 31.

In the confocal displacement sensor 1, in order to prevent measurement accuracy from being deteriorated by the influence of light reflected on the emission end face of the optical fiber 31, an emission end face 22a of the optical fiber ferrule 22 is obliquely machined. That is, the emission end face 22a is formed as an inclined surface inclined with respect to a plane perpendicular to the center axis of the optical fiber ferrule 22. The inclination of the emission end face 22a is formed by, for example, polishing. The optical fiber ferrule 22 is disposed with the center axis thereof inclined with respect to the optical axis J considering refraction that occurs when the detection light DL passes through the emission end face of the optical fiber 31.

The distance from the head unit 2 to the measurement object W is, for example, approximately 10 mm to 70 mm. The measurement range MR is approximately 1 mm to 20 mm. The measurement range MR corresponds to a band width of the detection light DL. In order to secure a wide measurement range MR, the detection light DL in a wide band is used. The detection light DL includes, for example, a wavelength component of 500 nm to 700 nm.

Light Source for Light Projection 41

FIGS. 3A and 3B are diagrams showing a configuration example of the light source for light projection 41 shown in FIG. 1. In FIG. 3A, a side surface of the light source for light projection 41 is shown. In FIG. 3B, a cut surface of the light source for light projection 41 cut along an A-A cut line is shown. The light source for light projection 41 is a light source device that irradiates laser light on a phosphor and causes the phosphor to generate white light. The light source for light projection 41 is configured by a light emitting element 411, a wiring board 412, an element holder 413, a condensing lens 414, a lens holder 415, a ferrule 416, a ferrule retainer 417, a phosphor 50, a frame body 51, and a filter element 52.

The light emitting element 411 is a semiconductor light emitting element such as a laser diode (LD). The light emitting element 411 generates laser light having a single wavelength. The light emitting element 411 is disposed on the wiring board 412 in a state in which a light emitting section is directed forward in the horizontal direction. For example, the light emitting element 411 generates blue light or ultraviolet light having a wavelength of 450 nm or less. The element holder 413 is a member that holds the wiring board 412. The element holder 413 is inserted into the lens holder 415 from the rear surface side.

The condensing lens 414 is an optical member that condenses laser light emitted from the light emitting element 411 to the incident end of the optical fiber 421. The condensing lens 414 is disposed to be opposed to the light emitting element 411. The lens holder 415 is a lens barrel that holds the condensing lens 414. The lens holder 415 is reduced in diameter in front of the condensing lens 414. The ferrule 416 is a cylindrical connection member in which the incident end of the optical fiber 421 is incorporated. The cylindrical connection member extends in the front-rear direction. The ferrule retainer 417 is a bottomed cylindrical member for fixing the ferrule 416 inserted into a reduced-diameter section of the lens holder 415 from the front surface side. The ferrule retainer 417 is attached to the lens holder 415 in a state in which a cylindrical section is put on the outer circumferential surface of the reduced-diameter section.

The phosphor 50 is a light emitting body that is excited by laser light emitted from the light emitting element 411 to generate fluorescent light having a wavelength different from the laser light. The phosphor 50 is disposed in the lens holder 415 in a state in which the outer circumferential surface of the phosphor 50 is held by the frame body 51 and the phosphor 50 is set in contact with the incident end face of the optical fiber 421. For example, the phosphor 50 generates yellow fluorescent light with irradiation of blue laser light. Note that the phosphor 50 may be formed of two or more kinds of fluorescent materials. For example, the phosphor 50 is formed of a fluorescent material that generates green fluorescent light with the irradiation of the blue laser light and a fluorescent material that generates red fluorescent light with the irradiation of the blue laser light.

The filter element 52 is an optical member that transmits laser light emitted from the light emitting element 411 and reflects fluorescent light emitted from the phosphor 50. The filter element 52 is disposed to cover the surface on the light emitting element side of the frame body 51. Light having a plurality of wavelengths obtained by mixing the laser light emitted from the light emitting element 411 and the fluorescent light emitted from the phosphor 50 is made incident on the incident end of the optical fiber 421.

The light source for light projection 41 is configured to make the light obtained by mixing the laser light emitted from the light emitting element 411 and the fluorescent light emitted from the phosphor 50 directly incident on the incident end of the optical fiber 421. By using such a fiber-type light source, it is possible to simplify connection to the fiber cable 3 between the head unit 2 and the control device 4.

Note that, as the light source for light projection 41, a light source that generates light in a wide band, for example, a halogen lamp, a white LED (light emitting diode) having extremely high luminance, an SC light source that generates super-continuum (SC) light, or a super-luminescent diode (SLD) may be used. The light source for light projection 41 may be a normal white LED. The SC light source generates laser light in a continuous and wide band with a nonlinear optical effect by a pulse laser.

Spectroscope 44

Figure 4:
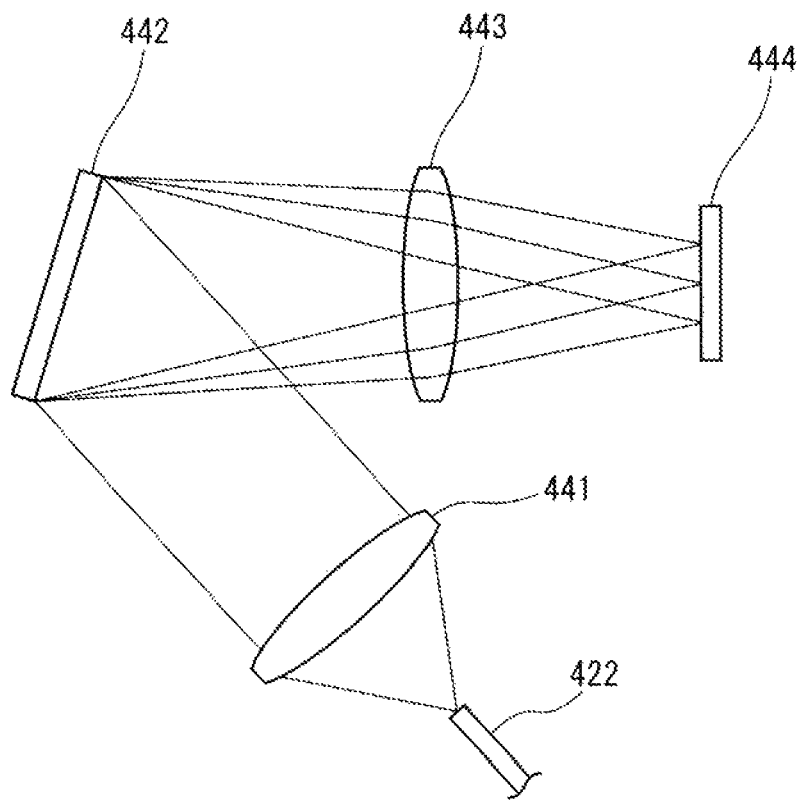
FIG. 4 is an explanatory diagram schematically showing a configuration example of a spectroscope shown in FIG. 1.

FIG. 4 is an explanatory diagram schematically showing a configuration example of the spectroscope 44 shown in FIG. 1. The spectroscope 44 of a reflection type is shown. The spectroscope 44 is configured by a collimator lens 441, a diffraction grating 442, an imaging lens 443, and an image sensor 444. The spectroscope 44 spectrally disperses the detection light DL emitted from the emission end of the optical fiber 422 of the coupler 42.

The emission end of the optical fiber 422, the diffraction grating 442, and the image sensor 444 are disposed to be directed to, for example, the horizontal direction. The collimator lens 441 is an optical lens for obtaining parallel light. The collimator lens 441 is disposed to be opposed to the emission end face of the optical fiber 422.

The diffraction grating 442 is a color dispersing element of a reflection type that reflects the detection light DL at a different angle according to a wavelength. The diffraction grating 442 is formed in a tabular shape. The imaging lens 443 focuses the detection light DL spectrally dispersed by the diffraction grating 442 on the image sensor 444. Note that both of the collimator lens 441 and the imaging lens 443 are single lenses. However, the collimator lens 441 and the imaging lens 443 may be doublet lenses each obtained by combining a plurality of optical lenses.

The image sensor 444 is, for example, a one-dimensional line image sensor extending in the horizontal direction. A large number of light receiving elements are linearly arrayed on the image sensor 444. A light reception waveform is formed by light reception signals of the light receiving elements. Note that an imaging element on which a large number of light receiving elements are two-dimensionally arrayed may be used as the image sensor 444.

In order to prevent light made incident on the image sensor 444 from being regularly reflected on a light receiving surface, reflected by the diffraction grating 442, and received again, the diffraction grating 442 is disposed to be slightly tilted from a state in which the diffraction grating 442 is right opposed to the light receiving surface of the image sensor 444. Note that the detection light DL may be spectrally dispersed using a prism. A color dispersing element of a transmission type may be used in the diffraction grating 442.

Figure 5A:
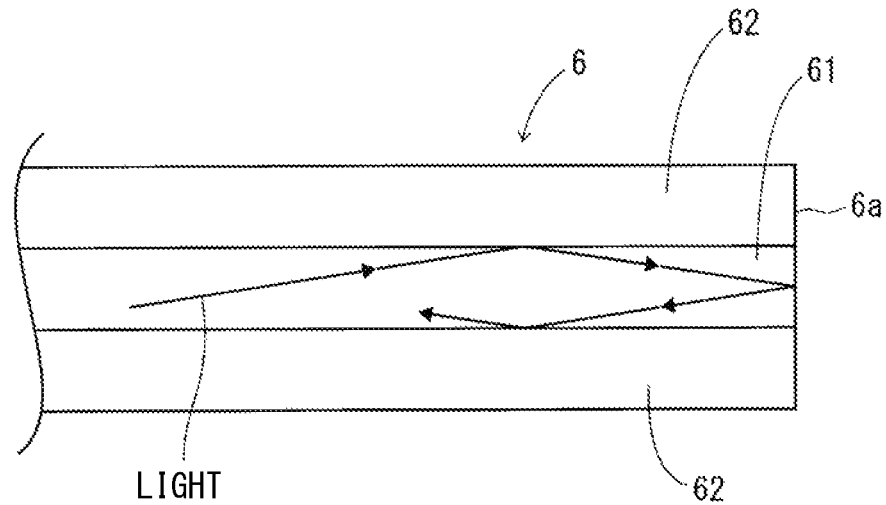
FIGS. 5A and 5B are explanatory diagrams schematically showing a state in which light being transmitted through an optical fiber is reflected by an end face.
Figure 5B:
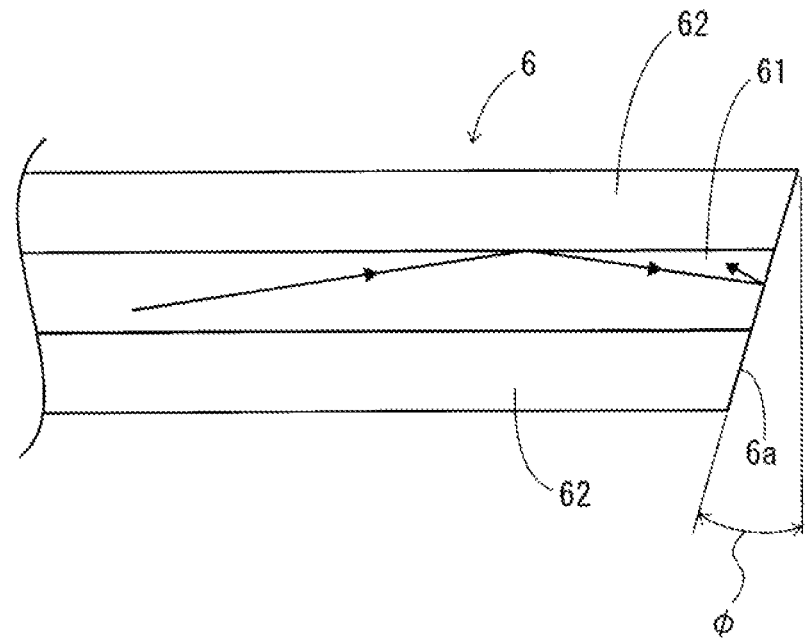

FIGS. 5A and 5B are explanatory diagrams schematically showing a state in which light being transmitted through an optical fiber 6 is reflected by an end face 6a. A cut surface cut along a plane including a center axis is shown. In FIG. 5A, the end face 6a is perpendicular to the center axis. In FIG. 5B, the end face 6a is inclined.

The optical fiber 6 is a transmission medium that transmits light. The optical fiber 6 is configured by a core 61 extending in a longitudinal direction and a clad 62 surrounding the core 61. The core 61 is formed of an optical material having a refractive index higher than a refractive index of the clad 62.

Light input to the optical fiber 6 is transmitted in the core 61 while repeating total reflection by an interface between the core 61 and the clad 62. When the end face 6a of the optical fiber 6 is perpendicular to the center axis, a part of light made incident on the end face 6a is reflected by the end face 6a and transmitted in the core 61 while repeating total reflection in the opposite direction of the light before the reflection.

On the other hand, when the end face 6a of the optical fiber 6 is inclined at an inclination angle $\phi$ with respect to the plane perpendicular to the center axis, light reflected by the end face 6a is made incident on the interface between the core 61 and the clad 62 at an angle of incidence smaller than an angle of incidence of the light before the reflection. Therefore, a part of the reflected light by the end face 6a is transmitted through the interface between the core 61 and the clad 62 and attenuated every time the reflection on the interface is repeated. Therefore, by inclining the end face 6a at a predetermined inclination angle $\phi$ (0<$\phi$<90°), it is possible to prevent transmission of the reflected light by the end face 6a.

Optical Fiber Ferrule 22

Figure 6:
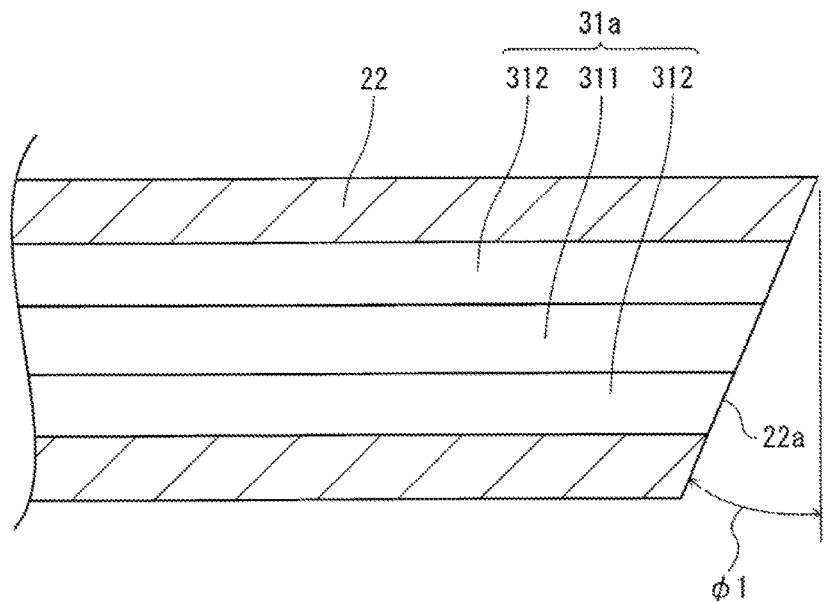
FIG. 6 is a sectional view showing an optical fiber ferrule shown in FIG. 2.

FIG. 6 is a sectional view showing the optical fiber ferrule 22 shown in FIG. 2. A cut surface of the optical fiber ferrule 22 cut along a plane including a center axis is shown. The optical fiber ferrule 22 is a holding member surrounding an emission end 31a of the optical fiber 31. The emission end face 22a is formed as an inclined surface inclined at an inclination angle $\phi$1.

The emission end 31a includes a core 311 extending along a center axis in a longitudinal direction and a clad 312 surrounding the core 311. The emission end 31a has an end face inclined at the inclination angle $\phi$1 with respect to a plane perpendicular to the center axis of the optical fiber 31.

As the inclination angle $\phi$1 of the emission end face 22a is larger, transmission of reflected light can be further reduced. Therefore, the inclination angle $\phi$1 is desirably 13° or more. The inclination angle $\phi$1 is, for example, 15°. However, when the inclination angle $\phi$1 is equal to or larger than a fixed angle, light is totally reflected on the end face of the emission end 31a and is not emitted from the emission end 31a. An upper limit of such an inclination angle $\phi$1 is determined by refractive indexes of the core 311 and the air and an angle of incidence of light on the plane perpendicular to the center axis of the optical fiber 31.

Figure 7:
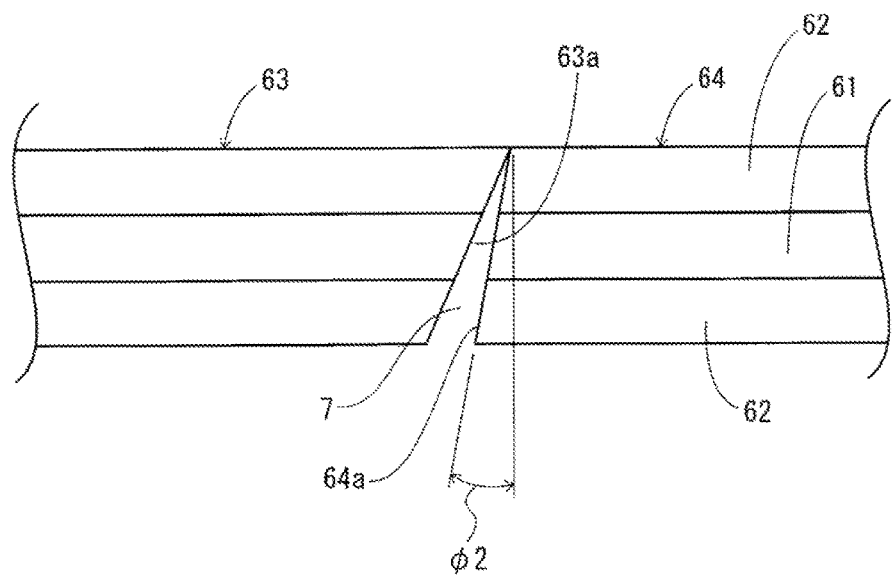
FIG. 7 is an explanatory diagram schematically showing a connecting section in which optical fibers are connected.

FIG. 7 is an explanatory diagram schematically showing a connecting section 60 in which optical fibers 63 and 64 are connected. A cut surface of the connecting section 60 cut along a plane including a center axis is shown. The connecting section 60 is a fiber connecting section that connects the optical fiber 63 and the optical fiber 64. The connecting section 60 is disposed in a state in which an incident end face 64a of the optical fiber 64 is abutted against an emission end face 63a of the optical fiber 63.

Both of the emission end face 63a and the incident end face 64a are formed as inclined surfaces inclined at an inclination angle $\phi$2 in order to prevent transmission of reflected light. A wedge-like air layer 7 is formed between the emission end face 63a and the incident end face 64a by the influence of a machining error. When such an air layer 7 is present, Fresnel reflection occurs. Therefore, the reflected light by the emission end face 63a and the incident end face 64a increases. The light transmitted from the optical fiber 63 to the optical fiber 64 decreases.

Therefore, in the confocal displacement sensor 1, the reflected light by the end faces is reduced by providing, in the fiber connecting sections 43 and 32, the refractive index matching material that reduces a change in the refractive index between the optical fiber 423 and the optical fiber 31.

Control Housing 40

Figure 8:
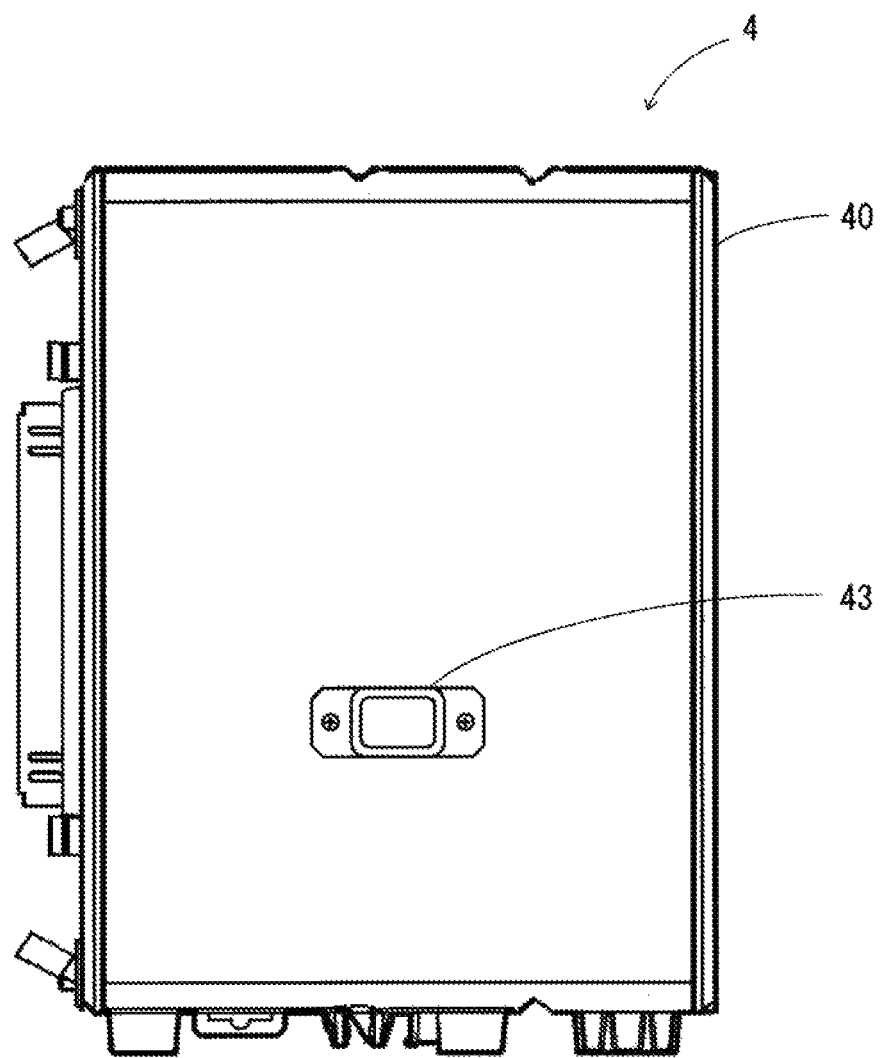
FIG. 8 is a diagram showing a configuration example of a control unit shown in FIG. 1.

FIG. 8 is a diagram showing a configuration example of the control unit 4 shown in FIG. 1. A front surface of a control housing 40 is shown. The control housing 40 is a housing member that houses, on the inside, the light source for light projection 41, the coupler 42 including the optical fibers 421 to 423, the spectroscope 44, and the measurement control section 45. The fiber connecting section 43 is disposed to be exposed from the front surface of the control housing 40. The fiber connecting section 43 includes a female connection port into which the fiber connecting section 32 is inserted. The fiber connecting section 43 is disposed with an end face inclined such that the optical fiber 31 projects obliquely downward from the control housing 40. Note that two or more fiber connecting sections 43 for respectively connecting two or more head units 2 may be provided in the control housing 40.

Fiber Connecting Sections 32 and 43

Figure 9:
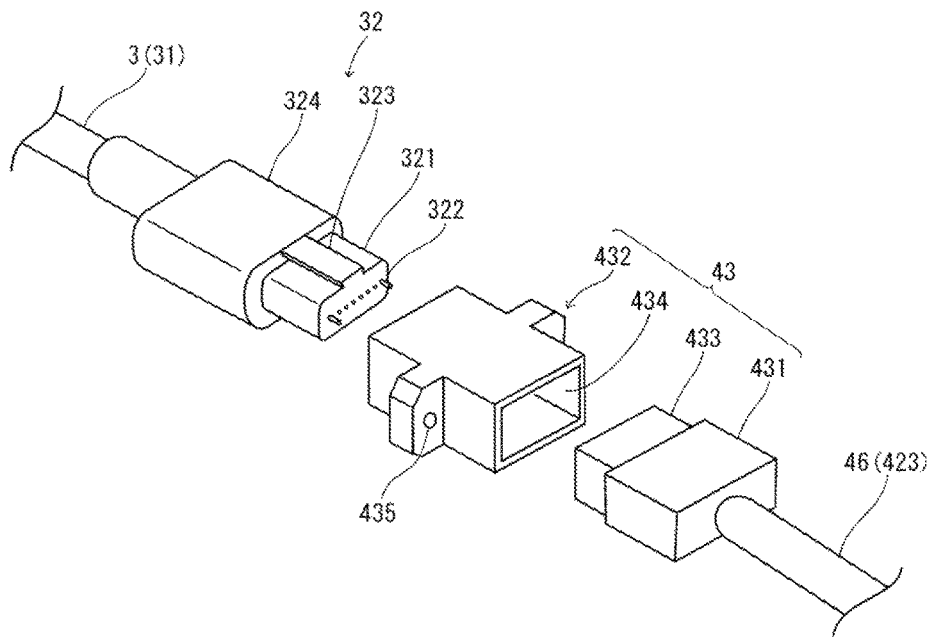
FIG. 9 is a perspective view showing a configuration example of fiber connecting sections shown in FIG. 1.
Figure 10:
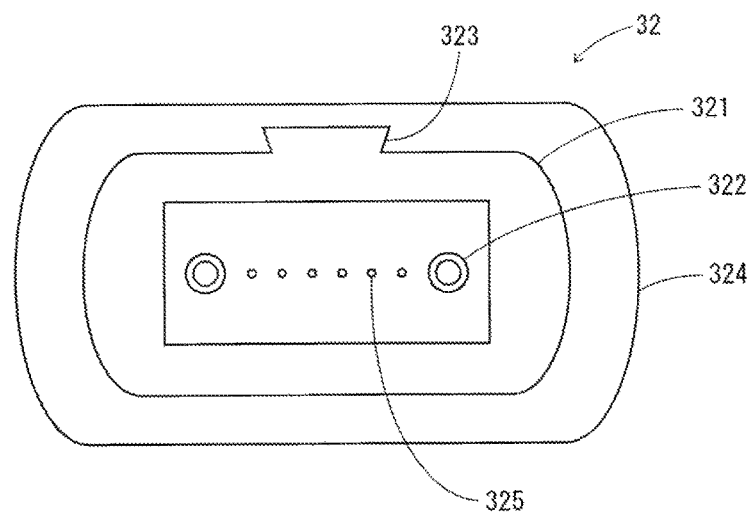
FIG. 10 is a diagram showing the fiber connecting section shown in FIG. 9.
Figure 11:
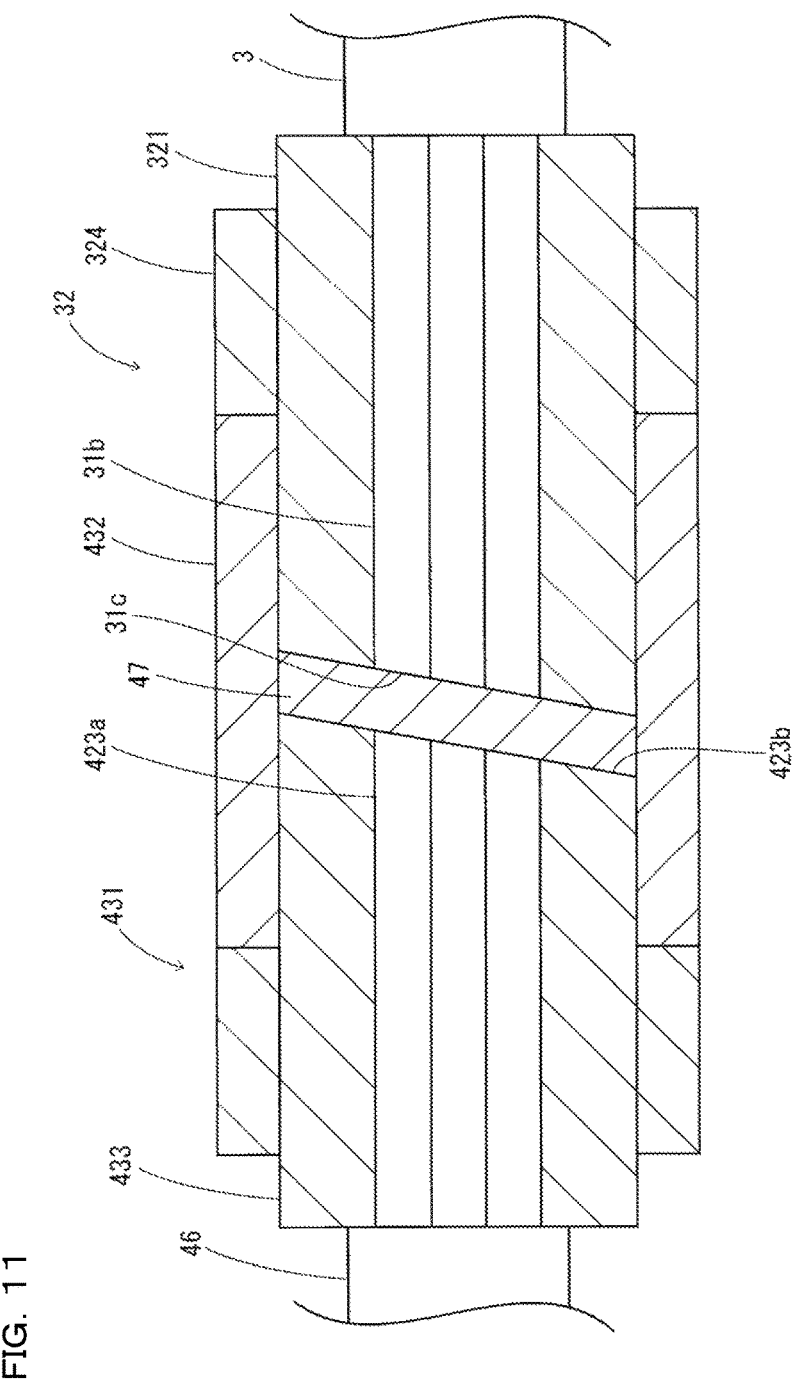
FIG. 11 is a sectional view showing the fiber connecting sections shown in FIG. 9.

FIG. 9 is a perspective view showing a configuration example of the fiber connecting sections 32 and 43 shown in FIG. 1. A state before connection is shown. FIG. 10 is a diagram showing the fiber connecting section 32 shown in FIG. 9. The fiber connecting section 32 viewed from an inserting and removing direction is shown. FIG. 11 is a sectional view showing the fiber connecting sections 32 and 43 shown in FIG. 9. A cut surface of the fiber connecting sections 32 and 43 cut along a plane including the center axis of the optical fibers 31 and 423 and passing between engaging pins 322 is shown.

The fiber connecting section 32 is a plug member provided at an end portion of the fiber cable 3 extending from the head unit 2. The fiber connecting section 32 is configured by a ferrule section 321, engaging pins 322, an engaging convex section 323, and a holder section 324. The fiber connecting section 32 is a multicore connector that simultaneously attaches and detaches a plurality of optical fibers 31. Note that a single core connector may be used as the fiber connecting sections 32 and 43.

The ferrule section 321 is a holding section that holds an incident end 31b of the optical fiber 31. The ferrule section 321 projects in the inserting and removing direction from the holder section 324. A plurality of fiber holes 325 in which the incident end 31b is disposed, two engaging pins 322, and the engaging convex section 323 are provided in the ferrule section 321.

The engaging pins 322 are positioning members for aligning the position of the incident end 31b of the optical fiber 31 with an emission end 423a of the optical fiber 423.

The engaging pins 322 are provided to project in the inserting and removing direction from the distal end face of the ferrule section 321. The engaging pins 322 are disposed on both outer sides of the array of the optical fiber 31. The engaging convex section 323 is a key section for defining the direction of the fiber connecting section 32. The engaging convex section 323 is formed in a shape projecting from an upper side surface of the ferrule section 321 and extending in the inserting and removing direction.

On the other hand, the fiber connecting section 43 is configured by a plug section 431 provided at an end portion of the fiber cable 46 including the optical fiber 423 and a connection adapter 432, into one plug insertion port 434 of which the plug section 431 is detachably inserted and into the other plug insertion port 436 of which the fiber connecting section 32 is inserted.

The plug section 431 includes a ferrule section 433 in which the emission end 423a of the optical fiber 423 extending from the coupler 42 is disposed. The connection adapter 432 is a socket member. The connection adapter 432 inserts the plug section 431 in the inserting and removing direction via the plug insertion port 434 and inserts the fiber connecting section 32 in the inserting and removing direction via the plug insertion port 436. In the connection adapter 432, an attachment hole 435 for attaching the connection adapter 432 to the control housing 40 using a fastening member such as a screw is provided.

The ferrule section 321 of the fiber connecting section 32 surrounds the incident end 31b of the optical fiber 31. An incident end face 31c is formed as an inclined surface inclined at the inclination angle $\phi2$ with respect to a plane perpendicular to the center axis. The ferrule section 433 of the plug section 431 surrounds the emission end 423a of the optical fiber 423. An emission end face 423b is formed as an inclined surface inclined at the inclination angle $\phi2$ with respect to a plane perpendicular to the center axis.

As the inclination angle $\phi2$ of the incident end face 31c and the emission end face 423b is larger, transmission of reflected light can be further reduced. However, when the inclination angle $\phi2$ is too large, deviation of the center axis easily occurs because of a slip between the incident end face 31c and the emission end face 423b. Therefore, the inclination angle $\phi2$ is desirably an angle smaller than the inclination angle $\phi1$ and equal to or larger than 5° and equal to or smaller than 15°. The inclination angle $\phi2$ is, for example, 8°.

A refractive index matching material 47 that reduces a change in a refractive index between the optical fiber 423 and the optical fiber 31 is disposed between the incident end face 31c and the emission end face 423b. The refractive index matching material 47 is a matching member formed of a material that has a refractive index close to a refractive index of the core of the optical fiber 423 and the core of the optical fiber 31 and transmits light. The refractive index matching material 47 is disposed between the emission end 423a of the optical fiber 423 and the incident end 31b of the optical fiber 31 in contact with both the end faces.

The refractive index matching material 47 is, for example, easy-to-handle sheet-like and stuck to a joining surface of the fiber connecting section 43. Specifically, the refractive index matching material 47 is stuck to the distal end face of the ferrule section 433. The refractive index matching material 47 is a solid. Therefore, the refractive index matching material 47 is easy to handle. Compared with when the refractive index matching material 47 is liquid, it is possible to prevent the refractive index matching material 47 from flowing out from the fiber connecting section 43 and staining the peripheries of the fiber connecting sections 32 and 43. Note that the refractive index matching material 47 may be gelatinous.

By using a material having tackiness as the refractive index matching material 47, when the refractive index matching material 47 is detached and replaced, it is possible to cause foreign matters such as dust adhering to the joining surfaces of the fiber connecting sections 32 and 43 to adhere to the refractive index matching material 47 and remove the foreign matters.

The head unit 2 is replaced when recombination of or damage to a manufacturing line occurs. During such replacement of the head unit 2 or when the head unit 2 is reset or when the head unit 2 is moved, the head unit 2 needs to be separated from the control unit 4. Therefore, one end of the fiber cable 3 extending from the head unit 2 is repeatedly attached to and detached from the control unit 4.

When the refractive index matching material 47 is disposed on the head unit side, there are more opportunities for the refractive index matching material 47 to be moved together with the head unit 2. Therefore, foreign matters such as dust easily adhere to the surface of the refractive index matching material 47. Therefore, the refractive index matching material 47 is desirably disposed on the control unit side. For example, the refractive index matching material 47 is fixed to a joining surface on the control housing 40 side using an adhesive.

Refractive Index Matching Material 47

Figure 12:
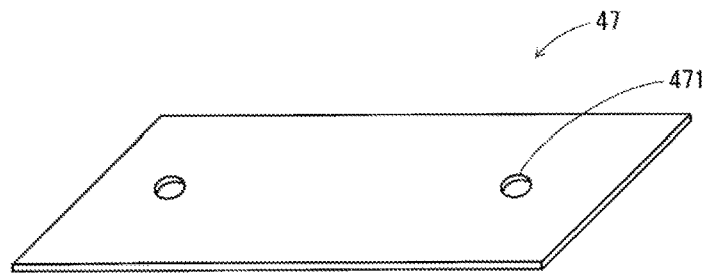
FIG. 12 is a perspective view showing a refractive index matching material shown in FIG. 11.

FIG. 12 is a perspective view showing the refractive index matching material 47 shown in FIG. 11. The refractive index matching material 47 is formed of a rectangular flat plate.

Pinholes 471 for inserting through the engaging pins 322 of the fiber connecting section 32 are formed in the refractive index matching material 47.

In the refractive index matching material 47, the same material as a material used in a communication device can be used. The communication device transmits a pulse signal. On the other hand, the refractive index matching material 47 transmits detection light. Therefore, it is important to reduce a transmission loss in order to reduce a measurement error.

Connection Adapter 432

Figure 13A:
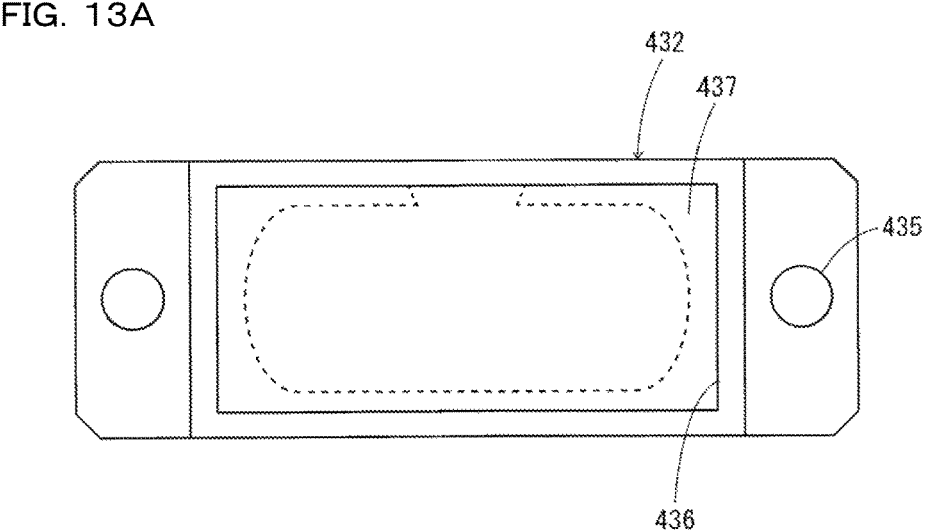
FIGS. 13A and 13B are diagrams showing a configuration example of an adapter for connection shown in FIG. 9.
Figure 13B:
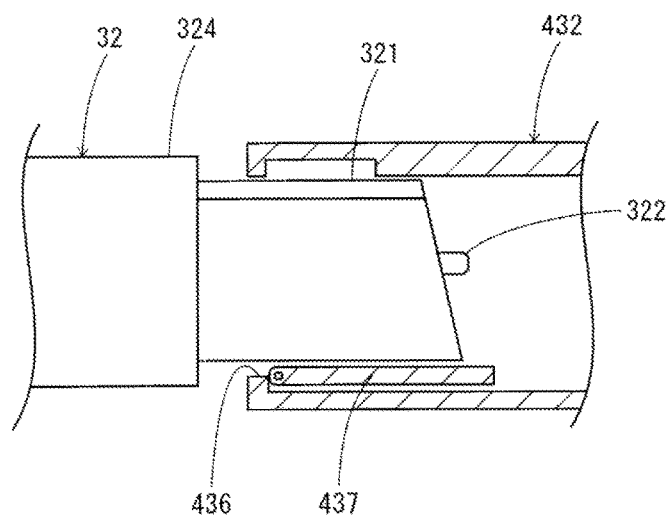

FIGS. 13A and 13B are diagrams showing a configuration example of the connection adapter 432 shown in FIG. 9. In FIG. 13A, the plug insertion port 436 of the connection adapter 432 is shown. In FIG. 13B, a cut surface of the connection adapter 432 cut along a plane including the inserting and removing direction and passing between the engaging pins 322 is shown. In the connection adapter 432, a protection shutter 437 for protecting the joining surface of the fiber connecting section 43 is provided.

The protection shutter 437 is a lid member formed of a rectangular flat plate. The protection shutter 437 is attached to the plug insertion port 436 to be openable and closable. The protection shutter 437 is automatically opened by inserting the fiber connecting section 32 in the inserting and removing direction via the plug insertion port 436 and automatically closed by removing the fiber connecting section 32.

By providing the protection shutter 437 in the connection adapter 432 of the fiber connecting section 43, it is possible to protect the end face of the emission end 423a in the fiber connecting section 43 from scratches and adhesion of stains or prevent light for light projection from leaking from the plug insertion port 436.

According to this embodiment, since all of the emission end 423a of the optical fiber 423 and the incident end 31b and the emission end 31a of the optical fiber 31 have the inclined end faces, transmission of light reflected on the end faces is prevented. Therefore, it is possible to reduce a background component corresponding to the reflected light by the end faces. Since the refractive index matching material 47 is disposed between the emission end 423a and the incident end 31b and a change in a refractive index decreases, it is possible to prevent the reflection by the end faces. Therefore, it is possible to improve measurement accuracy for a measurement object having a low reflectance.

Since the refractive index matching material 47 is disposed on the control housing 40 side, it is possible to replace the head housing 20 and the optical fiber 31 without replacing the refractive index matching material 47. Since the refractive index matching material 47 is sheet-like, it is easy to handle the refractive index matching material 47.

Note that, in this embodiment, the example is explained in which the coupler 42 is the Y coupler. However, an X coupler may be used. By providing a ferrule at an output end of an optical fiber extending from the X coupler and forming an end face of the ferrule as an inclined surface, it is possible to prevent the influence of reflected light by the output end.

Figure 14A:
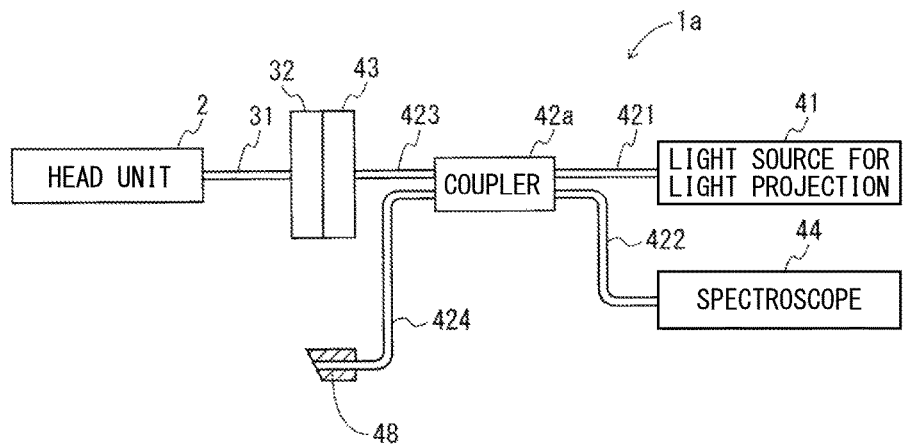
FIGS. 14A and 14B are system diagram showing another configuration example of the confocal displacement sensor.
Figure 14B:
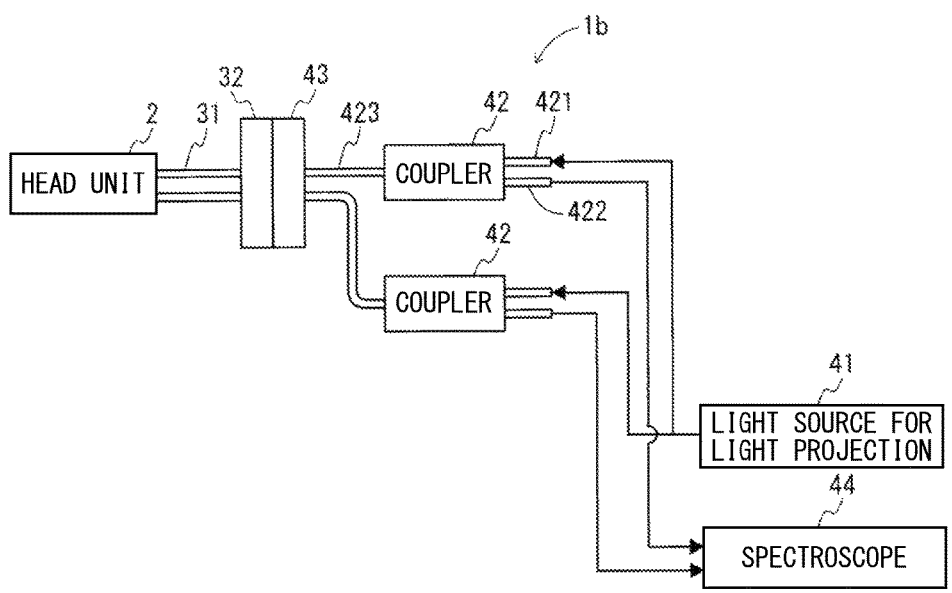

FIGS. 14A and 14B are system diagrams showing another configuration example of the confocal displacement sensor 1. In FIG. 14A, a confocal displacement sensor 1a is shown in which a ferrule 48 is provided at an output end of an optical fiber 424 extending from a coupler 42a is shown. The coupler 42a is an X coupler, from one end of which two optical fibers 421 and 422 extend and from the other end of which two optical fibers 423 and 424 extend.

An emission end face of the ferrule 48 is obliquely machined. That is, the emission end face is formed as an inclined surface inclined with respect to a plane perpendicular to the center axis of the ferrule 48. Therefore, it is possible to prevent measurement accuracy from being deteriorated by the influence of light reflected on the emission end face of the optical fiber 424.

In FIG. 14B, a confocal displacement sensor 1b is shown that forms two irradiation spots on the measurement object W using two couplers 42 and acquires two light reception waveforms respectively corresponding to the irradiation spots. The couplers 42 are Y couplers. Light for light projection is input to the couplers 42 from a common light source for light projection 41 and output to the optical fiber 31 via common fiber connecting sections 43 and 32. Reflected light from the measurement object W is input to the couplers 42 via the head unit 2, the optical fiber 31, and the fiber connecting sections 32 and 43 and output to the spectroscope 44. Note that the couplers 42 may be the coupler 42a (the X coupler) shown in FIG. 14A.

Figure 15:
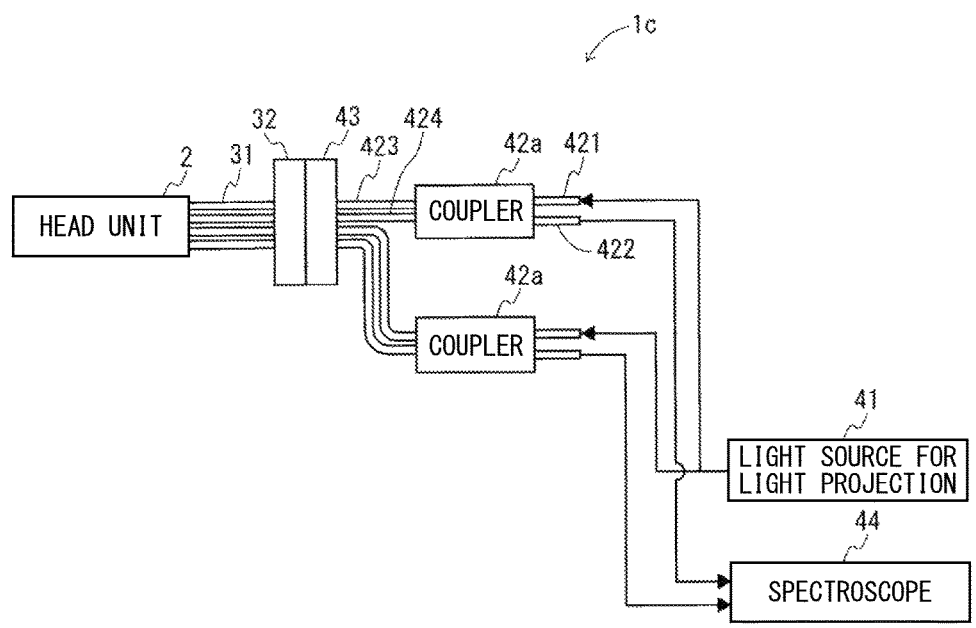
FIG. 15 is a system diagram showing another configuration example of the confocal displacement sensor.

FIG. 15 is a system diagram showing another configuration example of the confocal displacement sensor 1. A confocal displacement sensor 1c is shown that forms four irradiation spots on the measurement object W using two couplers 42a (X couplers). The optical fibers 423 and 424 extending from the couplers 42a are respectively connected to four optical fibers 31 via common fiber connecting sections 43 and 32.

Note that a configuration may be adopted in which the light for light projection is transmitted to the head unit 2 using three or more couplers 42 or 42a and three or more optical fibers 31, three or more irradiation spots are formed, and three or more light reception waveforms respectively corresponding to the irradiation spots are acquired.

What is claimed is:

1. A confocal displacement sensor that measures displacement of a measurement object using a confocal optical system, the confocal displacement sensor comprising:
 a light source for light projection configured to generate light having a plurality of wavelengths;
 a first optical fiber, to a first incident end of which light emitted from the light source for light projection is input, the first optical fiber outputting the light from a first emission end;
 a second optical fiber, a second incident end of which is disposed to be opposed to the first emission end, the second optical fiber emitting light input via the second incident end from a second emission end;
 an optical member configured to cause an axial chromatic aberration on detection light emitted via an end face of the second emission end and converge the detection light toward the measurement object;
 a spectroscope configured to spectrally disperse, in the detection light irradiated on the measurement object via the optical member, detection light passed through the end face of the second emission end by being reflected while focusing on the measurement object and generate a light reception signal representing light reception intensity for each wavelength;
 a measurement control section configured to calculate displacement of the measurement object on the basis of the light reception signal;
 a fiber connecting section configured to detachably connect the second incident end to the first emission end; and
 a refractive index matching material disposed between the first emission end and the second incident end in contact with both end faces of the first emission end and the second incident end and configured to reduce a change in a refractive index between the first optical fiber and the second optical fiber, wherein the second emission end has the end face inclined at a first inclination angle with respect to a plane perpendicular to a center axis of the second optical fiber, and the second incident end and the first emission end respectively have the end faces inclined at a second inclination angle smaller than the first inclination angle.

2. The confocal displacement sensor according to claim 1, further comprising:

a head housing configured to house the optical member and the second emission end on an inside; and a control housing configured to house the light source for light projection, the first optical fiber, the spectroscope, and the measurement control section on an inside and disposed to expose the fiber connecting section from a front surface, wherein the refractive index matching material is sheet-like and stuck to a joining surface of the fiber connecting section.

3. The confocal displacement sensor, according to claim 2, wherein the refractive index matching material is a solid or gelatinous.

4. The confocal displacement sensor according to claim 3, wherein a protection shutter is provided in an insertion port of the fiber connecting section into which the second incident end is inserted.

5. The confocal displacement sensor according to claim 3, wherein the first inclination angle is 13° or more and the second inclination angle is 5° or more and 15° or less.

6. The confocal displacement sensor, according to claim 2, wherein a protection shutter is provided in an insertion port of the fiber connecting section into which the second incident end is inserted.

7. The confocal displacement sensor according to claim 2, wherein the first inclination angle is 13° or more and the second inclination angle is 5° or more and 15° or less.

8. The confocal displacement sensor according to claim 2, wherein the refractive index matching material is fixed to a joining surface on the control housing side using an adhesive.

9. The confocal displacement sensor according to claim 1, wherein the refractive index matching material is a solid or gelatinous.

10. The confocal displacement sensor, according to claim 9, wherein a protection shutter is provided in an insertion port of the fiber connecting section into which the second incident end is inserted.

11. The confocal displacement sensor according to claim 9, wherein the first inclination angle is 13° or more and the second inclination angle is 5° or more and 15° or less.

12. The confocal displacement sensor according to claim 1, wherein a protection shutter is provided in an insertion port of the fiber connecting section into which the second incident end is inserted.

13. The confocal displacement sensor according to claim 12, wherein the first inclination angle is 13° or more and the second inclination angle is 5° or more and 15° or less.

14. The confocal displacement sensor according to claim 1, wherein the first inclination angle is 13° or more and the second inclination angle is 5° or more and 15° or less.

15. The confocal displacement sensor according to claim 1, wherein the refractive index matching material is fixed to a joining surface on the control housing side using an adhesive.

* * * * *